2,208,582

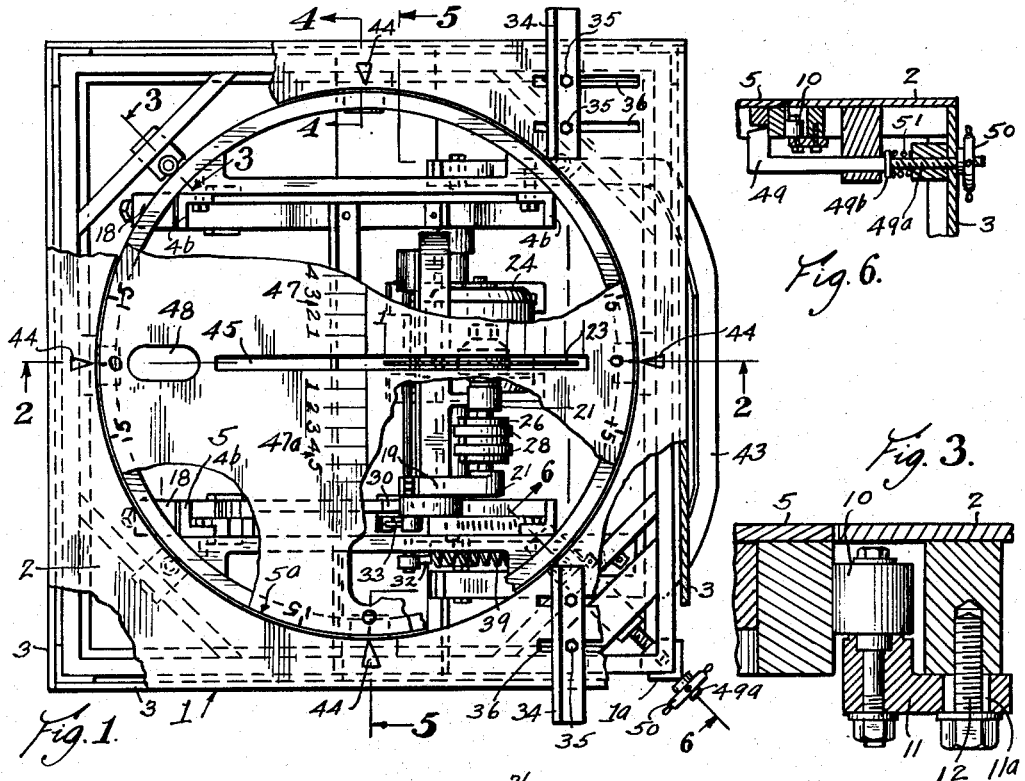
July 23, 1940.  J. R. HOLLISTER  2,208,582
SAWING MACHINE
Filed Aug. 25, 1937   2 Sheets-Sheet 1
Inventor:
John R. Hollister July 23, 1940.  J. R. HOLLISTER  2,208,582
SAWING MACHINE
Filed Aug. 25, 1937  2 Sheets-Sheet 2
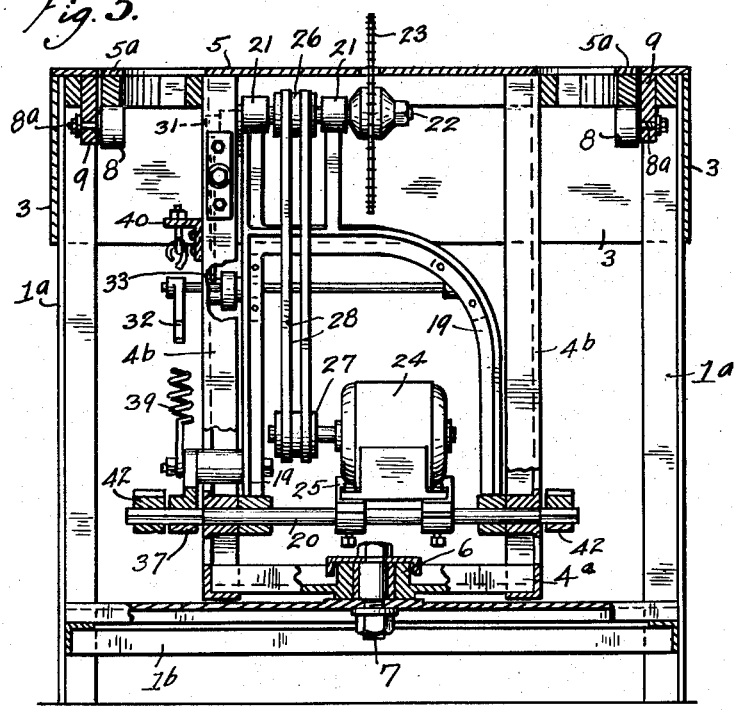
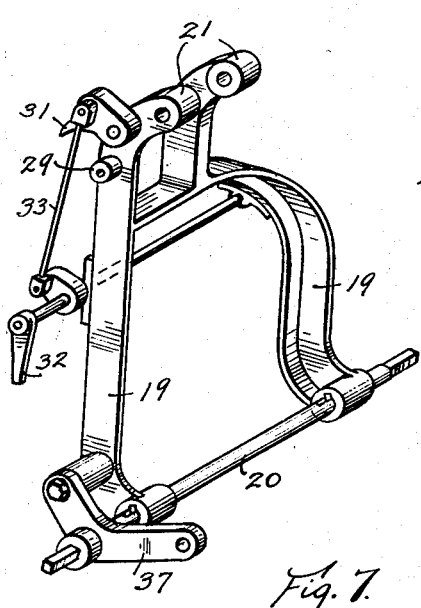
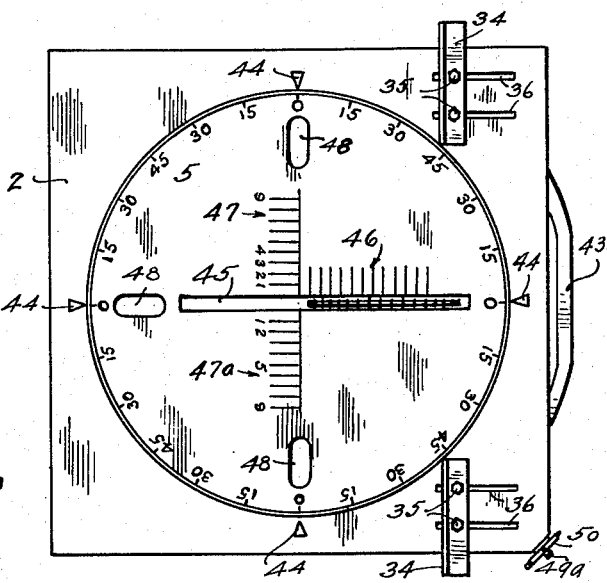
Inventor:
John R. Hollister Patented July 23, 1940

UNITED STATES PATENT OFFICE 2,208,582

SAWING MACHINE

John R. Hollister, Portland, Oreg.

Application August 25, 1937, Serial No. 160,812

4 Claims. (Cl. 143—6)

My invention relates to a sawing machine adapted to cut stock at any selected angle throughout a wide range. My invention preferably is incorporated in a machine having a saw mounted upon a swing frame so that the saw is depressible and may be selectively actuated to move the saw into engaging position. At all other times, the saw is arranged below the plane of the stock arranged upon the cutting table.

The principal object of my invention is to provide a sawing machine of this character in which stock being operated upon can be arranged upon the upper or work engaging portion of said machine and the saw and operating connections thereof arranged below the plane of the stock. Said saw can easily and quickly be adjusted laterally throughout a relatively wide range to vary the cutting angle of the saw without disturbing the stock and without requiring the stock to be shifted from the stops arranged therefor upon said machine.

A further object of my invention is to provide a sawing machine of this character with a turntable arrangement adapted to carry all of the operating or driving mechanisms for said saw, said turntable being provided with a series of gauge marks for easily and quickly computing the angular position of the saw and with operating connections which permit the saw to be easily and quickly moved into sawing position after the path of the saw has been determined.

A further and more specific object of my invention is to provide a saw of this character in which the mass of the saw, the driving connections therefor, the motor, and the turntable are so proportioned and the swing frame is so arranged that the center of mass of the frame and mechanisms carried thereby is arranged at one side of, but adjacent, the pivot axis of the swing frame. So-called "compensating" springs are carried by said swing frame, which springs tend to center the swing frame assembly at a point intermediate the ends of the operating path thereof. Said springs are arranged and are selected to have such strength as to be insufficient to move said swing frame assembly alone, but only in connection with a lever. Said lever preferably is provided with a treadle. Said springs are of such strength as to tend to balance said swing frame and to ease the operation thereof under the influence of said treadle. Said springs tend to snub the swing frame as it approaches the ends of its operating stroke and tend to aid the operator in moving said swing frame assembly away from the ends of the operating path thereof, but to leave the operation of said swing frame assembly under the control of the operating lever therefor.

A further and more specific object of my invention is to provide a saw having a turntable which is easily and quickly adjustable to the desired angle, which is mounted to pivot about a vertical axis, which is provided with adjustable devices arranged to support said turntable securely so as not to gyrate about said axis, and with operation connections carried by said turntable including a swing frame housed therein and an operating lever for said swing frame, all arranged so that said turntable can easily and quickly be swung to the desired angle with relation to the frame of said saw and can be easily and securely locked in said position.

Further objects and advantages of my invention are hereinafter described with reference to the accompanying drawings, in which:

Fig. 1 is a plan view of a machine embodying my invention with portions of the top thereof being shown broken away to disclose operating details which would otherwise have been concealed;

Fig. 2 is a vertical section thru said machine taken on the line 2—2 in Fig. 1;

Fig. 3 is an enlarged detail view showing one of the lateral guides for adjustably holding the turntable to its vertical axis of rotation, said detail view being a fragmentary section taken on the line 3—3 in Fig. 1;

Fig. 4 is a further enlarged scale, sectional view thru one of the supporting rollers for said turntable taken on the line 4—4 in Fig. 1;

Fig. 5 is a vertical section thru said machine taken at right angles to the section 2—2 and on the line 5—5 in Fig. 1;

Fig. 6 is a fragmentary sectional view taken on the line 6—6 in Fig. 1 and shows the releasable locking mechanism for holding the turntable in set position;

Fig. 7 is a perspective view of the swing frame of my invention, mounted upon its horizontal pivot shaft; and Fig. 8 is a plan view of the top of my invention, showing the gauge marks and grouped indicia for aiding an operator in easily and quickly computing the angle to which he wishes to set said saw.

A sawing machine embodying my invention comprises a main frame 1, made up of a plurality of structural members. Legs 1a are arranged at the corners of the frame, said frame being substantially square. The said legs are tied together adjacent the bottom by angles 1b, and at the top by a bounding frame 1c. A top member 2, preferably made of steel plate, rests upon the frame and constitutes a part of the stock supporting surface. Depending side members 3 are secured to the outer faces of the frame so that the top portion is more or less inclosed.

An auxiliary frame 4 is mounted for rotation about a vertical axis within the bounds of said main frame. The said auxiliary frame carries a turntable 5 upon its upper surface. Said turntable is a circular disc and fits tightly within the top member 2, sufficient clearance being provided to permit the turntable to rotate freely. The lower portion of the auxiliary frame is mounted upon a single bearing member 6, including a spindle 7 which holds the auxiliary frame to the main frame. The turntable is provided with a pendent peripheral rim 5a, and a series of supporting rollers 8 are arranged to engage the under surface of said rim and to hold the turntable in horizontal alinement with the top member 2. There are preferably a plurality of these rollers, four being shown in the drawings, and said rollers are carried by laterally disposed shafts or pins 8a, carried by brackets 9, which extend from the said top. Spaced between said supporting rollers are guide rollers 10. Said guide rollers engage the face of the rim 5a and tend to hold the turntable so that it rotates exactly about its pivot axis which extends thru the spindle bolt 7. Said guide rollers are carried by supports 11 (see Fig. 3) which are adjustably carried by a main frame member, being secured thereto by a stud 12. The supports are provided each with an elongated hole 11a thru which the stud passes. Said supports can thus be adjusted longitudinally to move the guide rollers inwardly and outwardly to aline the turntable exactly upon its pivot axis.

The auxiliary frame 4 is preferably made in two halves joined together by a transverse tying element 4a, as shown in Fig. 1. The sides 4b are left-hand and right-hand, respectively, each comprising a U-shaped structural member, secured at its upper end to the turntable and supported at its lower end by said bearing member 6. Extending across one of said auxiliary frame sides is a curved bracing portion 13 in which an arcuate guide slot 14 is cut. At the end of each of said slots, stops 15 are arranged. Said stops are held by coiled springs 16. The tension in said springs can be adjusted by a screw 17 held in place by brackets 18 and 18a, respectively, at each side.

A swing frame 19 is pivotally mounted in the auxiliary frame upon a transverse shaft 20 (see Fig. 7). Said swing frame is of inverted U-shaped section and carries outstanding ears 21, at its upper or free end. Said swing frame is pivotally secured to the shaft 20 by keys 20a, and thus the swing frame rotates with said shaft. The upper end carries ears 21a in which a saw mandrel 22 is rotatably journaled. A cut-off saw 23 is carried by said mandrel.

As closely adjacent the transverse shaft 20 as is physically possible, I arrange a motor 24 for driving said cut-off saw. Said motor is shown as an electric motor, but it is obvious that any power device could be used, such as an internal combustion engine, turbine or power-driven shaft. Said motor is carried by a bracket 25 secured to the swing frame. The cut-off saw 23 is provided with a pair of driving pulleys 26 which are alined with a motor pulley 27, secured to the shaft 24a of the motor 24. I preferably provide a plurality of narrow belts 28 for connecting the pulleys 26 and 27, and preferably make said belts V-shaped or A-shaped in section, as I find that there is less slippage between belts thus arranged in endless form about pulleys, in this character of work.

Extending laterally from one side of the swing frame 19 is a guide roller 29, which bears in the guide slot 14 formed in one of the auxiliary frame members. This is shown most clearly in Fig. 2. Said roller fits quite tightly in said guide slot and thus not only holds the swing frame against lateral movement but also tends to steady said frame and therewith the saw, as said saw is moved into and out of operating position. Upon the upper face of the curved bracing portion 13 are a series of ratchet teeth 30. A pivoted pawl is carried by the swing frame and is controlled by a pair of laterally spaced lever arms 32 connected to said pawl by a link 33. The pawl is adapted to be moved into and out of engagement with the ratchet teeth by said pair of levers and the saw can be fixed in any position where the pawl engages the ratchet teeth. I preferably arrange said ratchet teeth adjacent the point where the saw is in operating position as I deem it desirable to lock the saw only in this position. I provide several ratchet teeth, however, to vary the position of the saw with respect to work engaging stops 34 carried by the top member 2 of the main frame. That is, lumber, boards, timber or other stock to be operated upon are arranged transversely of said top and in abutment with said stops 34. The saw 23 can be arranged to move toward and from said stops, or may be locked in operating position where it extends thru the turntable to the maximum degree as shown in Fig. 2.

If desired, said stops can be removed and the work fed to the saw. Said work engaging stops are secured by releasable bolts 35 which pass thru slotted apertures 36 in said top member 2. Said stops thus can move over a substantial distance with regard to the operating length of the path of the saw, the length of said slotted apertures 36 being shown in Fig. 1.

Also secured to the transverse shaft 20 upon which the swing frame 19 is secured, is a bell crank lever 37. A pair of coiled springs 38 and 39 are secured respectively to the ends of said bell crank lever. Said springs are also secured to a bracket 40 which bracket is carried by one of the members 4b of the turntable. The swing frame is actuated by an operating lever 42 which has a treadle portion 43 at its outer end. Said operating lever grips the transverse shaft 20 by a cap 42a held in position by cap screws 42b. Depressing said treadle, as viewed in Fig. 2, causes the swing frame and therewith the cut-off saw 23 to be moved to its uppermost position as shown in full lines in Fig. 2 and permits said swing frame to drop under the force of gravity to cause it to assume the position shown in dotted lines in said figure. The springs 38 and 39 are arranged alternately to be thrown into tension by the movement of said swing frame toward and from said two opposite positions. At a point intermediate said two positions, the dual tension of said springs is at a minimum. That is, when the saw is moved to the position shown in Fig. 2, the spring 39 is put under substantial tension, and when the swing frame is arranged in the position shown in dotted lines, the spring 38 is put under tension. The springs are of substantial strength so as to impose a substantial force tending to move said swing frame toward a median position. They are not of sufficient strength, however, to actually move said swing frame. Thus, the swing frame is under the control of the operating lever, but the movement of the swing frame and the saw is aided to a large degree by said springs 38 and 39, which are termed "compensating" springs because they tend to compensate the mass or weight of said swing frame and the operating parts carried thereby. Said "compensating" springs have another function in that they tend to snub the swing frame as it approaches the end of its operating path in either direction and thus aid the coiled springs 16.

I preferably arrange the circular disc or top of the turntable with a series of gauge marks around its exterior. This is shown most clearly in Fig. 8. At every quarter turn, I arrange a zero, and from said zero arrange figures indicating fifteen degree angles of rotation to said zero mark. Thus, the figures run 0, 15°, 30°, 45°, 30°, 15°, 0, between each quarter turn. I arrange arrows or tell-tale marks 44 upon the top portion 2 of the frame, and thus when said arrow coincides with an angular mark, it indicates the degrees of angular turn which the turntable has made with respect to the base mark of zero. The turntable is provided with an elongated slot 45 along which the cut-off saw passes in moving into and out of operative position. Extending along said slots are a series of marks graduated in inches. These are in one group identified by the reference character 46. A corresponding group extends to both sides of said slots and are graduated in inches and are identified by the reference character 47a. Said group marks extend at right angles to the group 46, and are arranged to correspond to the markings on an ordinary carpenter's square. They extend in opposite directions as if marks were taken from two squares for the convenience of the operator. Also extending thru said turntable are a series of hand holds. By grasping said hand holds, the turntable can be easily and quickly adjusted to any desired position.

The turntable can be set at any position by a hook-shaped gripping mechanism 49. Said hook extends below and about the rim portion 5a of the turntable as is illustrated in Fig. 6. The said hook-shaped member can be longitudinally adjusted by the threaded portion 49a thereof which extends out thru one corner of the main frame, as is shown in Fig. 1. A wheel 50 engages the threaded portion 49a, and a coiled spring 51 tends to move the threaded portion out of engagement. A shoulder 49b prevents the hook from moving in beyond a limited degree. In Fig. 6 the hook is shown in engagement with the rim 5a. By slacking off the wheel, the hook will move out of engagement under the influence of said coiled spring. The turntable can then be rotated to a new setting and the wheel rotated in the opposite direction until the hook re-engages said rim and locks the turntable.

I claim:

1. A sawing machine comprising a main frame, an auxiliary frame, a turntable carried thereby, said turntable comprising a circular disc and a pendent peripheral flange extending below the upper surface of the disc, rollers engaging the lateral face of the pendent flange, said rollers constituting guides adapted to hold the disc to its axis of rotation, said auxiliary frame being journaled in said main frame for rotation about a vertical axis, a swing frame pivotally mounted adjacent one of its ends for lateral movement in said auxiliary frame and carrying a saw at its other end, an operating lever for said swing frame, an elongated, retractible compensating spring element secured to said swing frame adjacent said pivot axis, positioned to tend to center said swing frame assembly at a point intermediate the limits of its pivotal movement, guides arranged upon the auxiliary frame adjacent the path of said saw, an arcuate slot formed therein, guide rollers carried by the swing frame and riding in said arcuate slot to support laterally the swing frame in the auxiliary frame in all operating positions of the swing frame, and resilient stops arranged at the ends of the guide slot to limit the movement of the swing frame and a motor carried by said swing frame, operatively connected to said saw, the center of mass of said swing frame and the devices carried thereby being spaced in front of the pivot axis of said swing frame.

2. A sawing machine comprising a stationary main frame having a work engaging top portion, an auxiliary frame journalled in said main frame to rotate about a central vertical axis, a slotted rotatable turntable carried by said auxiliary frame and alined with the top portion of said main frame, a swing frame journalled adjacent one end in said auxiliary frame to pivot about a horizontal axis, said swing frame being adapted to carry a saw upon its free end positioned to pass thru and traverse the slotted portion of said turntable, a motor carried by said swing frame operatively connected to said saw, said auxiliary frame comprising more than two upright members adapted to engage and support said turntable and to hold it in a plane of rotation normal to the axis of rotation of said auxiliary frame, said auxiliary frame being provided with a central axial bearing member carried by said main frame, an arcuate guideway element extending between two of said upright auxiliary frame members, a guide carried by said swing frame adapted to engage said guideway and to give lateral support to said swing frame in all operating positions thereof, and a plurality of guide rollers carried by said main frame adapted to engage said turntable laterally to prevent gyration thereof, said guide rollers being adjustably mounted on said main frame to center said turntable therein thereby to prevent frictional contact between said turntable and said main frame.

3. A sawing machine comprising a stationary main frame having a work engaging top portion, an auxiliary frame journalled in said main frame to rotate about a central vertical axis, a slotted rotatable turntable carried by said auxiliary frame and alined with the top portion of said main frame, a swing frame journalled adjacent one end in said auxiliary frame to pivot about a horizontal axis, said swing frame being adapted to carry a saw upon its free end positioned to pass thru and traverse the slotted portion of said turntable, a motor carried by said swing frame operatively connected to said saw, said auxiliary frame comprising more than two upright members adapted to engage and support said turntable and to hold it in a plane of rotation normal to the axis of rotation of said auxiliary frame, said auxiliary frame being provided with a central axial bearing member carried by said main frame, an arcuate guideway element carried by said auxiliary frame, a guide carried by said swing frame adapted to engage said way and to give lateral support to said swing frame in all operating positions thereof, a plurality of guide rollers carried by said main frame adapted to engage said turntable laterally to prevent gyration thereof, said guide rollers being adjustably mounted on said main frame to center said turntable therein thereby to prevent frictional contact between said turntable and said main frame, and a pair of elongated retractable compensating springs secured to said swing frame adjacent its pivot axis but at opposite sides thereof positioned to tend to center said swing frame assembly at a point intermediate the limits of its pivotal movement, said springs being of insufficient strength to move said swing frame assembly.

4. A sawing machine comprising a stationary main frame having a work engaging top portion, an auxiliary frame journalled in said main frame to rotate about a central vertical axis, a slotted rotatable turntable carried by said auxiliary frame and alined with the top portion of said main frame, a swing frame journalled adjacent one end in said auxiliary frame to pivot about a horizontal axis, said swing frame being adapted to carry a saw upon its free end positioned to pass thru and traverse the slotted portion of said turntable, a motor carried by said swing frame operatively connected to said saw, said auxiliary frame comprising more than two upright members adapted to engage and support said turntable and to hold it in a plane of rotation normal to the axis of rotation of said auxiliary frame, said auxiliary frame being provided with a central axial bearing member carried by said main frame, an arcuate guideway element carried by said auxiliary frame, a guide carried by said swing frame adapted to engage said way and to give lateral support to said swing frame in all operating positions thereof, a plurality of guide rollers carried by said main frame adapted to engage said turntable laterally to prevent gyration thereof, said guide rollers being adjustably mounted on said main frame to center said turntable therein thereby to prevent frictional contact between said turntable and said main frame, a pair of elongated retractable compensating springs secured to said swing frame adjacent its pivot axis but at opposite sides thereof positioned to tend to center said swing frame assembly at a point intermediate the limits of its pivotal movement, said springs being of insufficient strength to move said swing frame assembly, a retractable hook-shaped securing means, and a threaded setting screw and a hand wheel therefor, for adjustably securing said turntable in set angular position with regard to said main frame, said securing means being arranged to bear directly opposite one of said guide rollers to enable the latter to resist the force exerted by said securing means without displacing said turntable from its axis of rotation, and detachable securing means for fixing said swing frame in position in said auxiliary frame.

JOHN R. HOLLISTER.